United States Patent
Sadek

(10) Patent No.: US 10,736,125 B2
(45) Date of Patent: Aug. 4, 2020

(54) RADIO ACCESS TECHNOLOGY (RAT) AGGREGATION ON A SHARED COMMUNICATION MEDIUM

(71) Applicant: QUALCOMM Incorporated, San Diego, CA (US)

(72) Inventor: Ahmed Kamel Sadek, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 79 days.

(21) Appl. No.: 15/587,374

(22) Filed: May 4, 2017

(65) Prior Publication Data

US 2017/0325251 A1     Nov. 9, 2017

Related U.S. Application Data

(60) Provisional application No. 62/332,570, filed on May 6, 2016.

(51) Int. Cl.
  *H04W 72/12*   (2009.01)
  *H04W 76/28*   (2018.01)
  *H04W 84/12*   (2009.01)
  *H04W 16/14*   (2009.01)
  *H04W 84/04*   (2009.01)
  *H04W 88/10*   (2009.01)

(52) U.S. Cl.
  CPC ... *H04W 72/1215* (2013.01); *H04W 72/1231* (2013.01); *H04W 16/14* (2013.01); *H04W 76/28* (2018.02); *H04W 84/042* (2013.01); *H04W 84/12* (2013.01); *H04W 88/10* (2013.01)

(58) Field of Classification Search
  CPC ......... H04W 72/1215; H04W 72/1231; H04W 88/10; H04W 16/14; H04W 84/042; H04W 84/12
  See application file for complete search history.

(56) References Cited

U.S. PATENT DOCUMENTS

| | | | |
|---|---|---|---|
| 9,312,976 B2 | 4/2016 | Zhang | |
| 9,491,632 B2 | 11/2016 | Sadek et al. | |
| 2012/0140743 A1* | 6/2012 | Pelletier | H04W 76/15 370/335 |
| 2012/0270592 A1* | 10/2012 | Ngai | H04W 52/226 455/522 |
| 2012/0289170 A1* | 11/2012 | Li | H04L 1/1854 455/73 |

(Continued)

OTHER PUBLICATIONS

International Search Report and Written Opinion—PCT/US2017/031402—ISA/EPO—dated Aug. 8, 2017.

*Primary Examiner* — Andrew Lai
*Assistant Examiner* — Harry H Kim
(74) *Attorney, Agent, or Firm* — MG-IP Law, P.C.

(57) ABSTRACT

Techniques for managing Radio Access Technology (RAT) aggregation on a shared communication medium are disclosed. Control signaling may be sent, over a shared communication medium to an access terminal, in accordance with a first RAT. Data traffic may be scheduled for transmission to the access terminal based on one or more operating mode criteria for selecting between RATs. The scheduled data traffic may be transmitted, over the shared communication medium to the access terminal, in accordance with a second RAT.

27 Claims, 10 Drawing Sheets

(56) References Cited

U.S. PATENT DOCUMENTS

| | | | |
|---|---|---|---|
| 2013/0203452 A1* | 8/2013 | Awoniyi | H04W 52/0203 455/500 |
| 2014/0194155 A1* | 7/2014 | Ko | H04B 1/406 455/552.1 |
| 2014/0334446 A1* | 11/2014 | Lim | H04W 28/08 370/331 |
| 2015/0018002 A1* | 1/2015 | Touag | H04W 72/0426 455/454 |
| 2015/0063099 A1 | 3/2015 | Sadek | |
| 2015/0085684 A1 | 3/2015 | Sadek | |
| 2016/0095110 A1* | 3/2016 | Li | H04W 72/1215 370/329 |
| 2016/0100318 A1* | 4/2016 | Wei | H04W 16/14 370/329 |
| 2016/0119846 A1 | 4/2016 | Chou et al. | |
| 2016/0127994 A1* | 5/2016 | Cho | H04W 76/28 370/311 |
| 2016/0157164 A1* | 6/2016 | Lee | H04W 48/16 370/329 |
| 2016/0234751 A1* | 8/2016 | Golaup | H04W 36/14 |
| 2016/0337063 A1 | 11/2016 | Sadek et al. | |
| 2016/0353316 A1* | 12/2016 | Boettger | H04W 36/0066 |
| 2017/0041844 A1* | 2/2017 | Richards | H04W 72/0453 |
| 2018/0227976 A1* | 8/2018 | Dudda | H04W 36/00 |
| 2018/0279355 A1* | 9/2018 | Soldati | H04W 72/1252 |

\* cited by examiner

RADIO ACCESS TECHNOLOGY (RAT) AGGREGATION ON A SHARED COMMUNICATION MEDIUM

CROSS-REFERENCE TO RELATED APPLICATIONS

The present application claims the benefit of U.S. Provisional Application No. 62/332,570, entitled "Radio Access Technology (RAT) Aggregation on a Shared Communication Medium," filed May 6, 2016, assigned to the assignee hereof and expressly incorporated herein by reference in its entirety.

BACKGROUND

Aspects of this disclosure relate generally to telecommunications, and more particularly to operations on a shared communication medium and the like.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as Long Term Evolution (LTE) provided by the Third Generation Partnership Project (3GPP), Ultra Mobile Broadband (UMB) and Evolution Data Optimized (EV-DO) provided by the Third Generation Partnership Project 2 (3GPP2), 802.11 provided by the Institute of Electrical and Electronics Engineers (IEEE), etc.

In cellular networks, "macro cell" access points provide connectivity and coverage to a large number of users over a certain geographical area. A macro network deployment is carefully planned, designed, and implemented to offer good coverage over the geographical region. To improve indoor or other specific geographic coverage, such as for residential homes and office buildings, additional "small cell," typically low-power access points have recently begun to be deployed to supplement conventional macro networks. Small cell access points may also provide incremental capacity growth, richer user experience, and so on.

Small cell LTE operations, for example, have been extended into the unlicensed frequency spectrum such as the Unlicensed National Information Infrastructure (U-NII) band used by Wireless Local Area Network (WLAN) technologies. This extension of small cell LTE operation is designed to increase spectral efficiency and hence capacity of the LTE system. However, it may also overlap with the operations of other Radio Access Technologies (RATs) that typically utilize the same unlicensed bands, most notably IEEE 802.11x WLAN technologies generally referred to as "Wi-Fi."

SUMMARY

Techniques for managing Radio Access Technology (RAT) aggregation on a shared communication medium are disclosed.

In one example, a communication method is disclosed. The method may include, for example, sending, over a shared communication medium to an access terminal, control signaling in accordance with a first Radio Access Technology (RAT); scheduling data traffic for transmission to the access terminal based on one or more operating mode criteria for selecting between RATs; and transmitting, over the shared communication medium to the access terminal, the scheduled data traffic in accordance with a second RAT.

In another example, a communication apparatus is disclosed. The apparatus may include, for example, at least one processor, at least one memory coupled to the at least one processor, and first and second transceivers. The first transceiver may be configured to send, over a shared communication medium to an access terminal, control signaling in accordance with a first RAT. The at least one processor and the at least one memory may be configured to schedule data traffic for transmission to the access terminal based on one or more operating mode criteria for selecting between RATs. The second transceiver may be configured to transmit, over the shared communication medium to the access terminal, the scheduled data traffic in accordance with a second RAT.

In another example, another communication apparatus is disclosed. The apparatus may include, for example, means for sending, over a shared communication medium to an access terminal, control signaling in accordance with a first RAT; means for scheduling data traffic for transmission to the access terminal based on one or more operating mode criteria for selecting between RATs; and means for transmitting, over the shared communication medium to the access terminal, the scheduled data traffic in accordance with a second RAT.

In another example, a transitory or non-transitory computer-readable medium is disclosed, which, when executed by at least one processor, causes the at least one processor to perform operations for communication. The computer-readable medium may include, for example, code for sending, over a shared communication medium to an access terminal, control signaling in accordance with a first RAT; code for scheduling data traffic for transmission to the access terminal based on one or more operating mode criteria for selecting between RATs; and code for transmitting, over the shared communication medium to the access terminal, the scheduled data traffic in accordance with a second RAT.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

The present disclosure relates generally to Radio Access Technology (RAT) aggregation procedures on a communication medium shared with multiple RATs. To better utilize the relative strengths of each RAT under different scenarios and conditions, an access point may selectively switch between the RATs to provide service to one or more access terminals over the shared communication medium. For example, whereas a more robust but narrowband RAT (e.g., a Long Term Evolution (LTE)-based technology) may be used for control signaling and data traffic for some access terminals, a less robust but wideband RAT (e.g., a Wi-Fi technology) may be used for data traffic for other access terminals. The access point may schedule different access terminals for data traffic in accordance with different RATs based on various operating mode criteria, including signal quality, traffic Quality of Service (QoS), mobility, and so on.

In general, data traffic for the different RATs may be scheduled in a Time Division Multiplexing (TDM) manner, although some RATs (e.g., those that permit independent uplink scheduling) may allow for more efficient use of the communication medium in a Frequency Division Multiplexing (FDM) manner as well. Further optimizations of a given RAT aggregation scheme may also be employed, such as power control, limiting beacon signaling, and so on.

More specific aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

Figure 1:
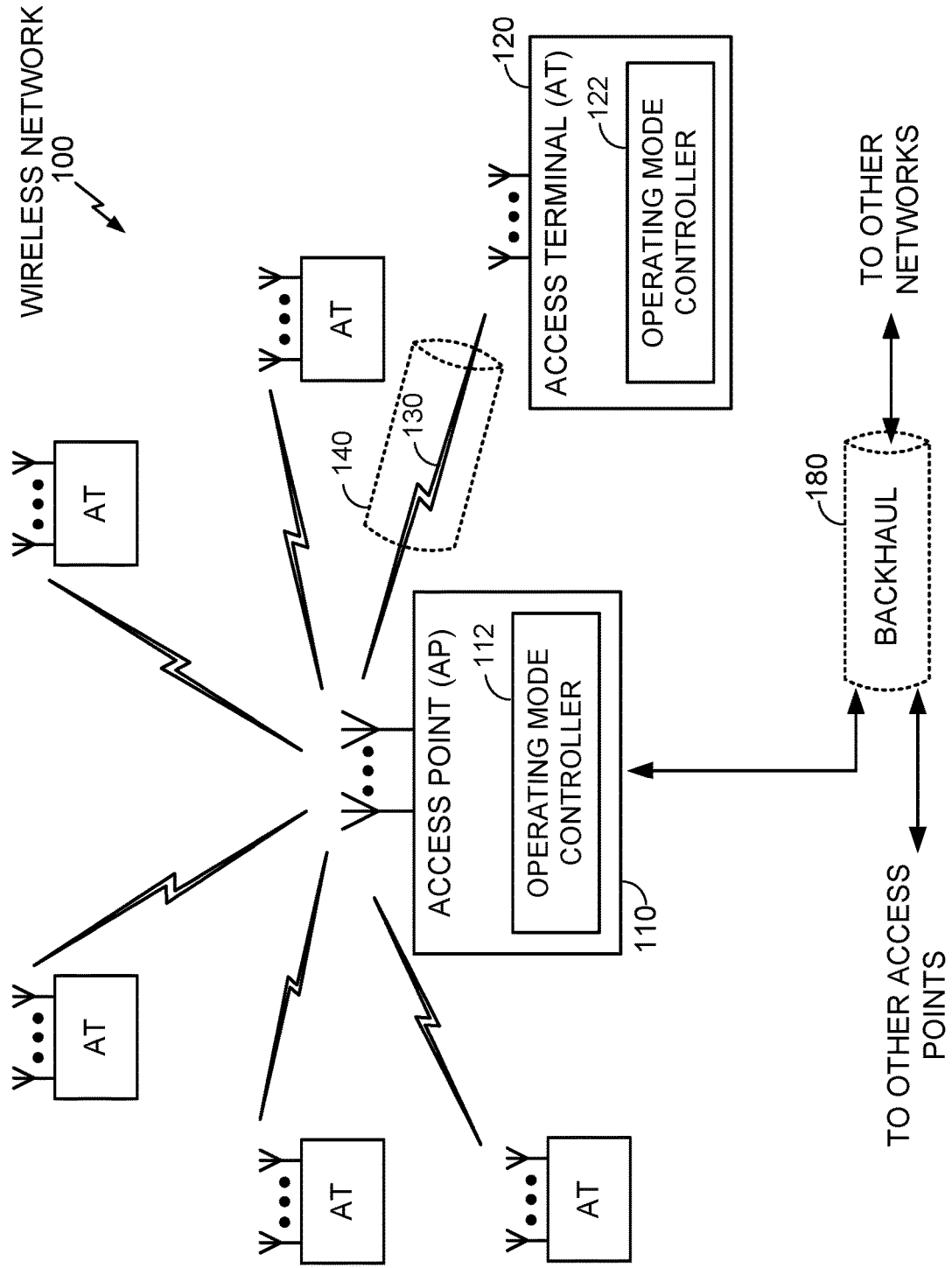
FIG. 1 is a system-level diagram illustrating an example wireless network environment.

FIG. 1 is a system-level diagram illustrating an example wireless network 100. As shown, the wireless network 100 is formed from several wireless nodes, including an access point (AP) 110 and an access terminal (AT) 120. Each wireless node is generally capable of receiving and/or transmitting over a wireless link 130. The wireless network 100 may support any number of access points 110 distributed throughout a geographic region to provide coverage for any number of access terminals 120. For simplicity, one access point 110 is shown in FIG. 1 as providing coordination and control among a plurality of access terminals 120, as well as providing access to other access points or other networks (e.g., the Internet) via a backhaul connection 180.

The access point 110 may correspond to a small cell access point, for example. "Small cells" generally refer to a class of low-powered access points that may include or be otherwise referred to as femto cells, pico cells, micro cells, Wireless Local Area Network (WLAN) access points, other small coverage area access points, etc. Small cells may be deployed to supplement macro cell coverage, which may cover a few blocks within a neighborhood or several square miles in a rural environment, thereby leading to improved signaling, incremental capacity growth, richer user experience, and so on.

Unless otherwise noted, the terms "access terminal" and "access point" are not intended to be specific or limited to any particular RAT. In general, access terminals may be any wireless communication device allowing a user to communicate over a communications network (e.g., a mobile phone, router, personal computer, server, entertainment device, Internet of Things (IOT)/Internet of Everything (JOE) capable device, in-vehicle communication device, etc.), and may be alternatively referred to in different RAT environments as a User Device (UD), a Mobile Station (MS), a Subscriber Station (STA), a User Equipment (UE), etc. Similarly, an access point may operate according to one or several RATs in communicating with access terminals depending on the network in which the access point is deployed, and may be alternatively referred to as a Base Station (BS), a Network Node, a NodeB, an evolved NodeB (eNB), etc. As an example, the access point 110 and the access terminal 120 may communicate via the wireless link 130 in accordance with a "primary" RAT such as Long Term Evolution (LTE) technology or variants thereof, and (if properly equipped) a "secondary" RAT such as any member of the Institute of Electrical and Electronics Engineers (IEEE) 802.11 wireless "Wi-Fi" protocol family.

Returning to FIG. 1, the wireless link 130 may operate over a communication medium 140 that is shared by multiple RATs such as the aforementioned primary and secondary RATs. A communication medium of this type may be composed of one or more frequency, time, and/or space communication resources (e.g., encompassing one or more channels across one or more carriers). As an example, the communication medium 140 may correspond to at least a portion of an unlicensed frequency band. Although different licensed frequency bands have been reserved for certain communications (e.g., by a government entity such as the Federal Communications Commission (FCC) in the United States), some systems, in particular those employing small cell access points, have extended operation into unlicensed and/or lightly licensed frequency bands such as the Unlicensed National Information Infrastructure (U-NII) band and the Citizens Broadband (CB) Radio Service band. Such systems may include operation in unlicensed or lightly licensed spectrum with or without anchor carrier(s) in licensed frequency.

Due to the shared use of the communication medium 140, there is the potential for cross-link interference and some jurisdictions may require contention or "Listen Before Talk (LBT)" for arbitrating access to the communication medium 140. As an example, a Clear Channel Assessment (CCA) protocol may be used in which each device verifies via medium sensing the absence of other traffic on a shared communication medium before seizing (and in some cases reserving) the communication medium for its own transmissions. In some designs, the CCA protocol may include distinct CCA Preamble Detection (CCA-PD) and CCA Energy Detection (CCA-ED) mechanisms for yielding the communication medium to intra-RAT and inter-RAT traffic, respectively. The European Telecommunications Standards Institute (ETSI), for example, mandates contention for all devices regardless of their RAT on certain communication media such as unlicensed frequency bands.

Different RATs may provide different advantages under different circumstances for use in facilitating communication between the access point 110 and the access terminal 120 over the shared communication medium 140. For example, cellular technologies such as LTE and its variants (including so-called "MuLTEfire" technology) may, in some instances, provide better coverage, mobility, robustness, and access terminal conformance as compared to WLAN technologies such as Wi-Fi. In general, an LTE-based RAT may utilize lower data rates and Hybrid Automatic Repeat Request (HARQ) protocols as well as more robust control channels than a Wi-Fi-based RAT, which even in some variants such as 802.11ax still utilizes a legacy preamble. An LTE-based RAT may also utilize a more robust pilot design than a Wi-Fi-based RAT. However, an LTE-based RAT may not as readily support wideband operations due to additional carrier aggregation requirements, for example. Wideband operation may be particularly desirable when access terminals operate in close proximity to each other (e.g., near cell-center regions) and under light to moderate loading conditions.

Because different RATs are associated with different advantages and drawbacks, a hybrid approach that leverages the advantages of different RATs while minimizing the effect of their respective drawbacks may be beneficial under certain circumstances. Such an approach may be particularly applicable in shared spectrum where multiple types of RATs may be available for use in the same frequency band. As will be described in more detail below, the access point 110 and/or the access terminal 120 may be variously configured in accordance with the teachings herein to provide or otherwise support the RAT-aggregation techniques discussed briefly above. For example, the access point 110 may include an operating mode controller 112 and the access terminal 120 may include an operating mode controller 122. The operating mode controller 112 and/or the operating mode controller 122 may be configured in different ways to aggregate the operations of different RATs on the shared communication medium 140.

Figure 2:
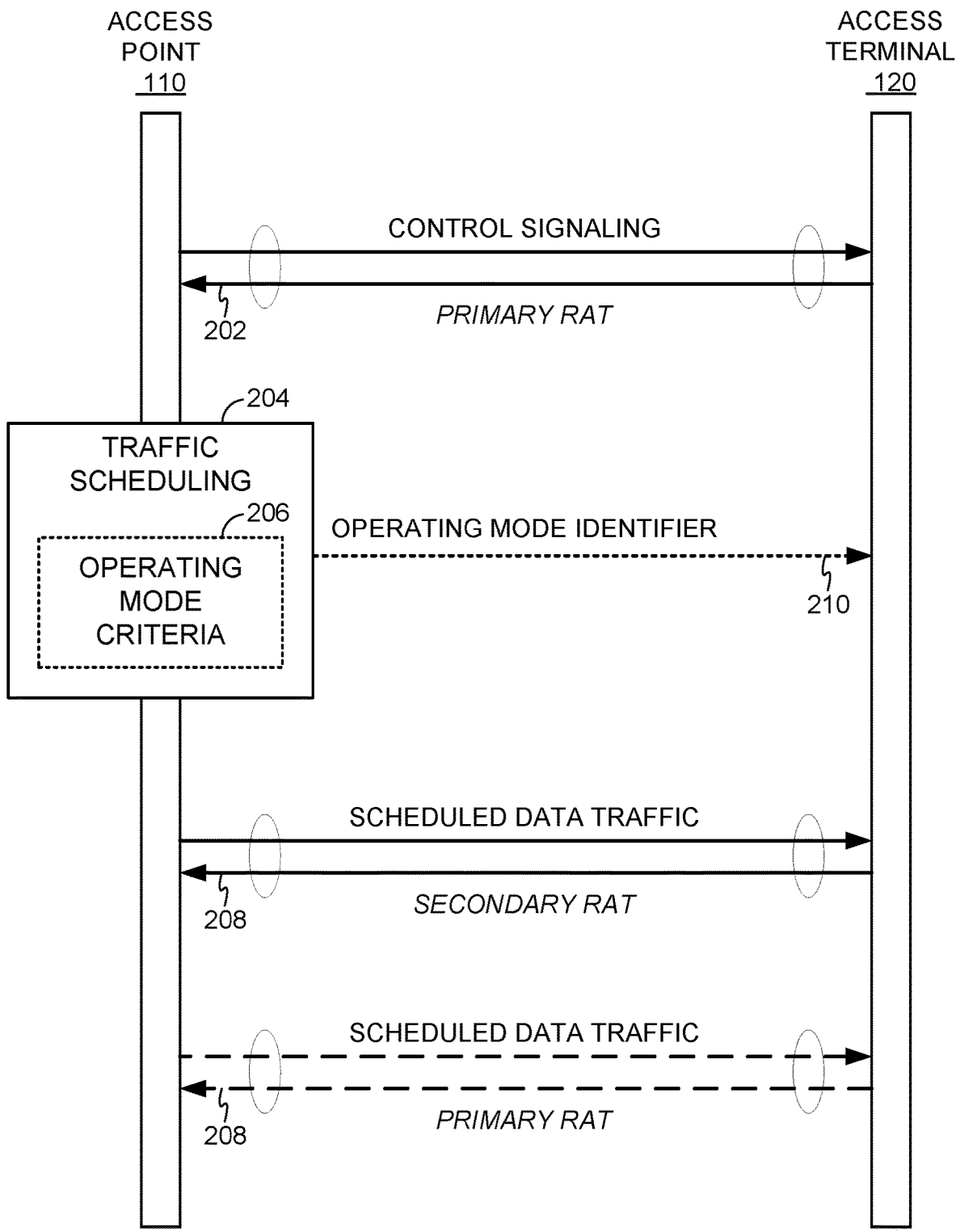
FIG. 2 is a signaling flow diagram illustrating example aspects of Radio Access Technology (RAT) aggregation.

FIG. 2 is a signaling flow diagram illustrating example aspects of RAT aggregation as provided herein. In this example, the access point 110 and the access terminal 120 are both capable of operation in accordance with a primary RAT such as LTE-based technology or the like that provides particularly robust operation, as well as a secondary RAT such as Wi-Fi-based technology or the like that provides more streamlined wideband operation. It will be appreciated, however, that different RATs in both type and number may be used in different systems as desired.

As shown, control signaling 202 may be generally sent and received over the communication medium 140 in accordance with the primary RAT for improved robustness. The control signaling 202 may include both pre-connection acquisition and discovery signaling as well as post-connection management signaling. For example, the control signaling 202 may be associated with system discovery, acquisition, authentication, mobility, Radio Resource Management (RRM), paging, Radio Link Failure (RLF), and/or Discontinuous Reception (DRX), as well other classes of control signaling that may be generally referred to as Discovery Reference Signals (DRS).

For each connected access terminal including the illustrated access terminal 120, the access point 110 may (independently) schedule (block 204) data traffic for transmission over either the primary RAT or the secondary RAT. By multiplexing between the two RATs at the scheduler level, the access point 110 is able to more tightly couple the aggregation process on a common set of channels making up the communication medium 140, as compared to lightly-coupled approaches in which the RATs are confined to separate communication media (e.g., separate frequency bands). Alternatively, instead of the primary and secondary RATs utilizing a common set of channels, the primary and secondary RATs may utilize different sets of channels in other embodiments of the disclosure. The different sets of channels utilized by the primary and secondary RATs in this alternative implementation may still overlap in part. In an example, the primary RAT (e.g., which may be used for more robust control, mobility, idle mode, etc.) may use fewer channels than the secondary RAT.

The scheduled data traffic 208 may then be sent and received over the communication medium 140 in accordance with the selected RAT. In the illustrated example, the scheduled data traffic 208 is transmitted in accordance with the secondary RAT. In addition or as an alternative, however, the scheduled data traffic 208 may also be transmitted in accordance with the primary RAT (shown by dashed lines in FIG. 2). In other words, the access terminal 120 and access point 110 may first perform system search and acquisition procedures and communication of relevant system information using a primary RAT, and then continue using the primary RAT or switch to a secondary RAT for further communications such as data communications, depending on the circumstances.

The scheduling (block 204) may be performed based on one or more operating mode criteria 206 for selecting between the RATs. The operating mode criteria may include, for example, a signal quality criterion, a traffic Quality of Service (QoS) criterion, a mobility criterion, or any other criterion for distinguishing between conditions or scenarios in which either the primary or secondary RAT may be more advantageous.

Figure 3:
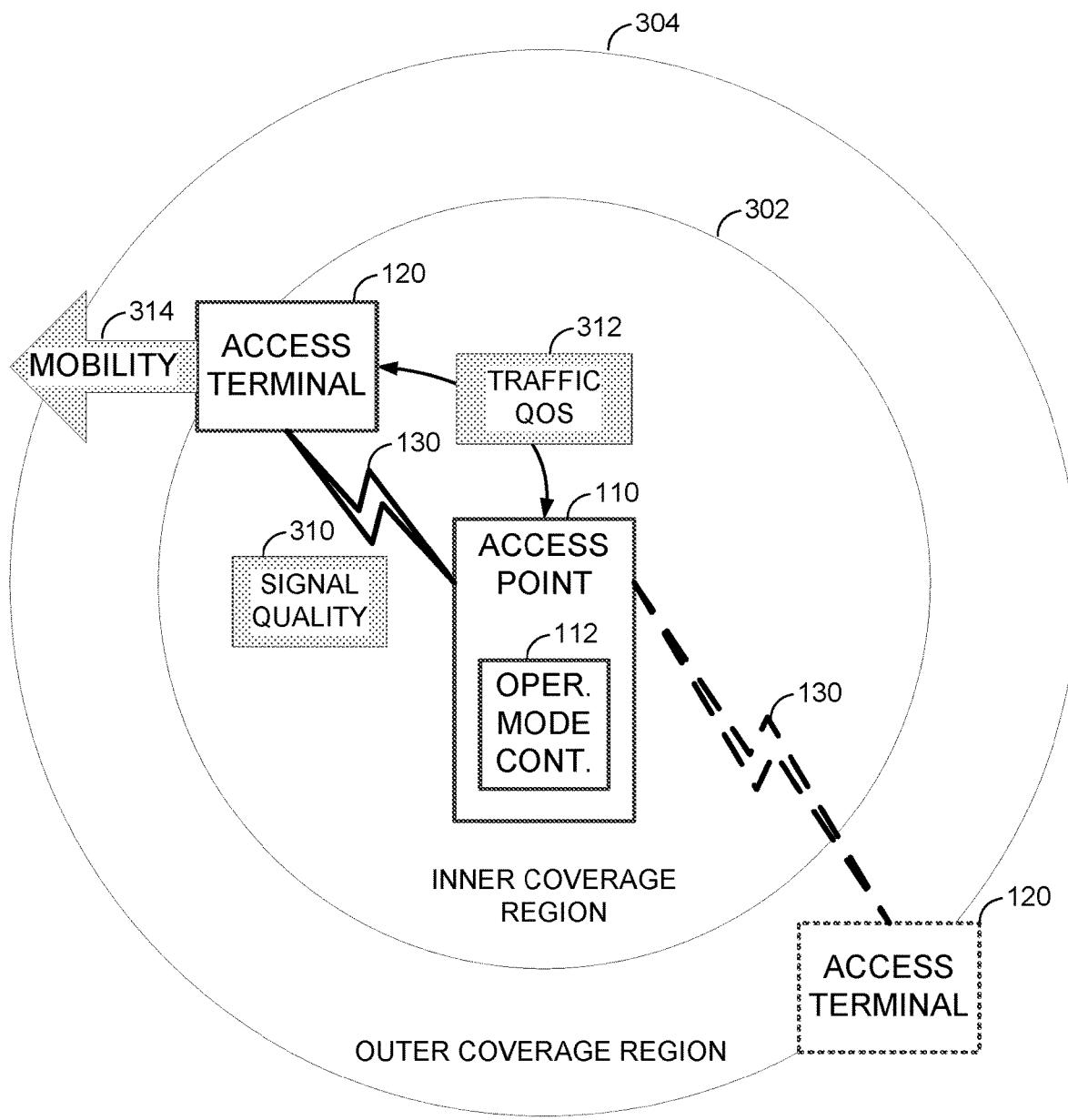
FIG. 3 is a system-level diagram illustrating the use of example operating mode criteria for facilitating RAT aggregation.

FIG. 3 is a system-level diagram illustrating the use of example operating mode criteria for facilitating RAT aggregation. In this example, the access point 110 is shown as communicating with the access terminal 120 over the communication medium 140 in an inner coverage region 302 (near so called "cell center") where the corresponding wireless link 130 is relatively strong. At other times, the access point 110 may also serve the access terminal 120 in an outer coverage region 304 (near so-called "cell edge") where the wireless link 130 is in comparison relatively weak.

A signal quality criterion 310 may be used to take into account the cell geometry of the access terminal 120 (cell center vs. cell edge) in scheduling it for transmission in accordance with either the primary or secondary RAT. In general, when the access terminal 120 is near the cell center and has a correspondingly high Signal-to-Interference-plus- Noise Ratio (SINR), for example (e.g., above a threshold), data traffic for the access terminal 120 may be scheduled for transmission in accordance with the secondary RAT (e.g., Wi-Fi). The more streamlined wideband operation of the secondary RAT may be advantageous in such a scenario because it allows interference to be mitigated between other nearby access terminals with minimal impact on throughput. Conversely, when the access terminal 120 is near the cell edge and has a correspondingly low SINR, for example (e.g., below a threshold), data traffic for the access terminal 120 may be scheduled for transmission in accordance with the primary RAT (e.g., LTE).

In addition or as an alternative, a traffic QoS criterion 312 may be used to take into account the flow requirements of the access terminal 120. In general, when the access terminal 120 requires a high QoS (e.g., above a threshold) such as Real Time (RT) QoS, data traffic for the access terminal 120 may be scheduled for transmission in accordance with the primary RAT (e.g., LTE). The more robust operating procedures of the primary RAT such as HARQ may help to provide better data integrity and so on. Conversely, when the access terminal 120 requires only a low QoS (e.g., below a threshold) such as Best Effort (BE) QoS, data traffic for the access terminal 120 may be scheduled for transmission in accordance with the secondary RAT (e.g., Wi-Fi).

In addition or as an alternative, a mobility criterion 314 may be used to take into account the likely handover or reselection needs of the access terminal 120. In general, when the access terminal 120 is highly mobile (e.g., above a threshold), data traffic for the access terminal 120 may be scheduled for transmission in accordance with the primary RAT (e.g., LTE). The more robust handover and reselection procedures of the primary RAT may help to provide more seamless coverage. Conversely, when the access terminal 120 is not highly mobile (e.g., below a threshold), data traffic for the access terminal 120 may be scheduled for transmission in accordance with the secondary RAT (e.g., Wi-Fi).

Returning to FIG. 2, the access point 110 may coordinate the operating mode with the access terminal 120 by sending an operating mode identifier 210 to the access terminal 120 to identify which RAT is being utilized for the scheduled data traffic 208. The access point 110 may communicate the operating mode identifier 210 to the access terminal 120 in different ways, including both dynamically and semi-statically.

As an example, the access point 110 may dynamically send the operating mode identifier 210 on a packet-by-packet basis as part of a physical layer (layer 1) message such as a channel reservation message preceding data transmission (e.g., as one bit of Wi-Fi preamble). Example channel reservation messages may include, for example, Clear-to-Send-to-Self (CTS2S) messages, Request-to-Send (RTS) messages, Clear-to-Send (CTS) messages, Physical Layer Convergence Protocol (PLCP) Signal (SIG) headers (e.g., a legacy signal (L-SIG), a high throughput signal (HT-SIG), or very high throughput signal (VHT-SIG)), a data packet such as a legacy 802.11a data packet, and the like for a Wi-Fi-based RAT, or other similar messages defined for other RATs of interest.

As another example, the access point 110 may send the operating mode identifier 210 semi-statically (e.g., on the order of tens of ms) as part of a Radio Resource Control (RRC) message.

In general, the access point 110 may serve access terminals operating in accordance with different RATs utilizing a Time Division Multiplexed (TDM) scheme, subject to any contention procedures for accessing the communication medium 140. While downlink data traffic is typically scheduled by the access point 110, uplink data traffic may or may not be scheduled by the access point 110. For example, the IEEE 802.11ac protocol does not support uplink data traffic scheduling by an access point whereas the IEEE 802.11ax protocol does support uplink data traffic scheduling by an access point. The TDM scheme employed may therefore depend on whether or not uplink data traffic is scheduled for a given RAT in addition to downlink data traffic. Two example TDM schemes are described below for illustration purposes, one without secondary RAT uplink scheduling and one with secondary RAT uplink scheduling.

Figure 4:
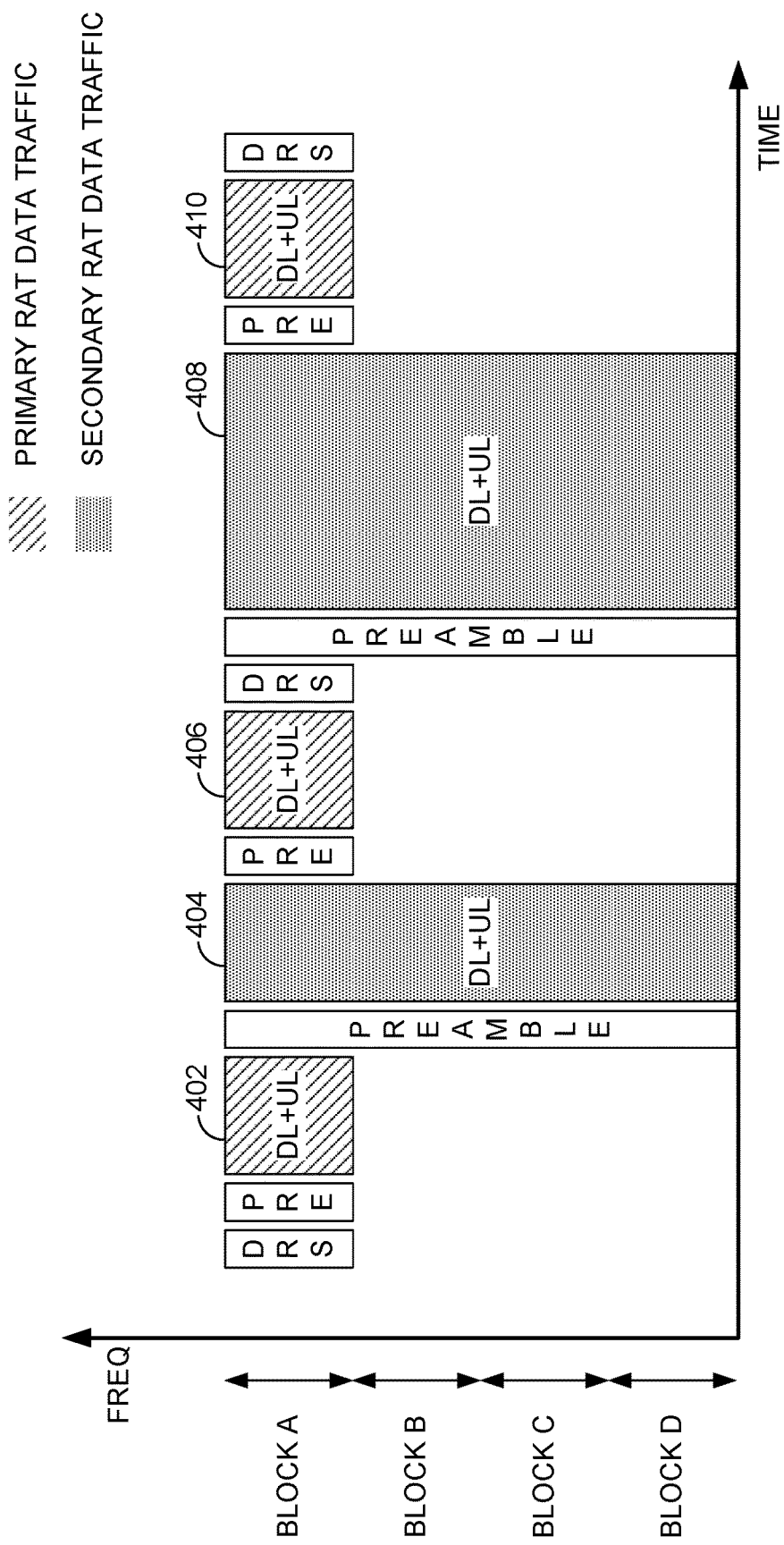
FIG. 4 is a resource diagram illustrating an example RAT-aggregation Time Division Multiplexing (TDM) scheduling scheme in which only downlink scheduling is supported by the secondary RAT.

FIG. 4 is a resource diagram illustrating an example RAT-aggregation TDM scheduling scheme in which only downlink scheduling is supported by the secondary RAT. In this example, the communication medium 140 encompasses four blocks of spectrum, including Blocks A-D. The primary RAT generally provides narrowband operation in Block A and the secondary RAT generally provides wideband operation in Blocks A-D. As discussed above, various control signaling may be sent as appropriate for a given implementation, including DRS and a channel-clearing preamble in the illustrated example.

As shown, due to the uplink scheduling limitations of the secondary RAT, each RAT may be generally served sequentially such that all uplink and downlink data traffic for a given RAT is confined within a common time period designated for that RAT. That is, uplink data traffic may be restricted to a time period otherwise scheduled for downlink data traffic of the same RAT to avoid inter-RAT interference.

In the illustrated example, uplink and downlink data traffic for access terminals designated for primary RAT operation may be exchanged in a first period of time 402 scheduled for primary RAT transmission. Uplink and downlink data traffic for access terminals designated for secondary RAT operation may be exchanged in a second period of time 404 scheduled for secondary RAT transmission. Uplink and downlink data traffic for access terminals designated for primary RAT operation may then again be exchanged in a third period of time 406 scheduled for primary RAT transmission, uplink and downlink data traffic for access terminals designated for secondary RAT operation may then again be exchanged in a fourth period of time 408 scheduled for secondary RAT transmission, uplink and downlink data traffic for access terminals designated for primary RAT operation may then again be exchanged in a fifth period of time 410 scheduled for primary RAT transmission, and so on.

Figure 5:
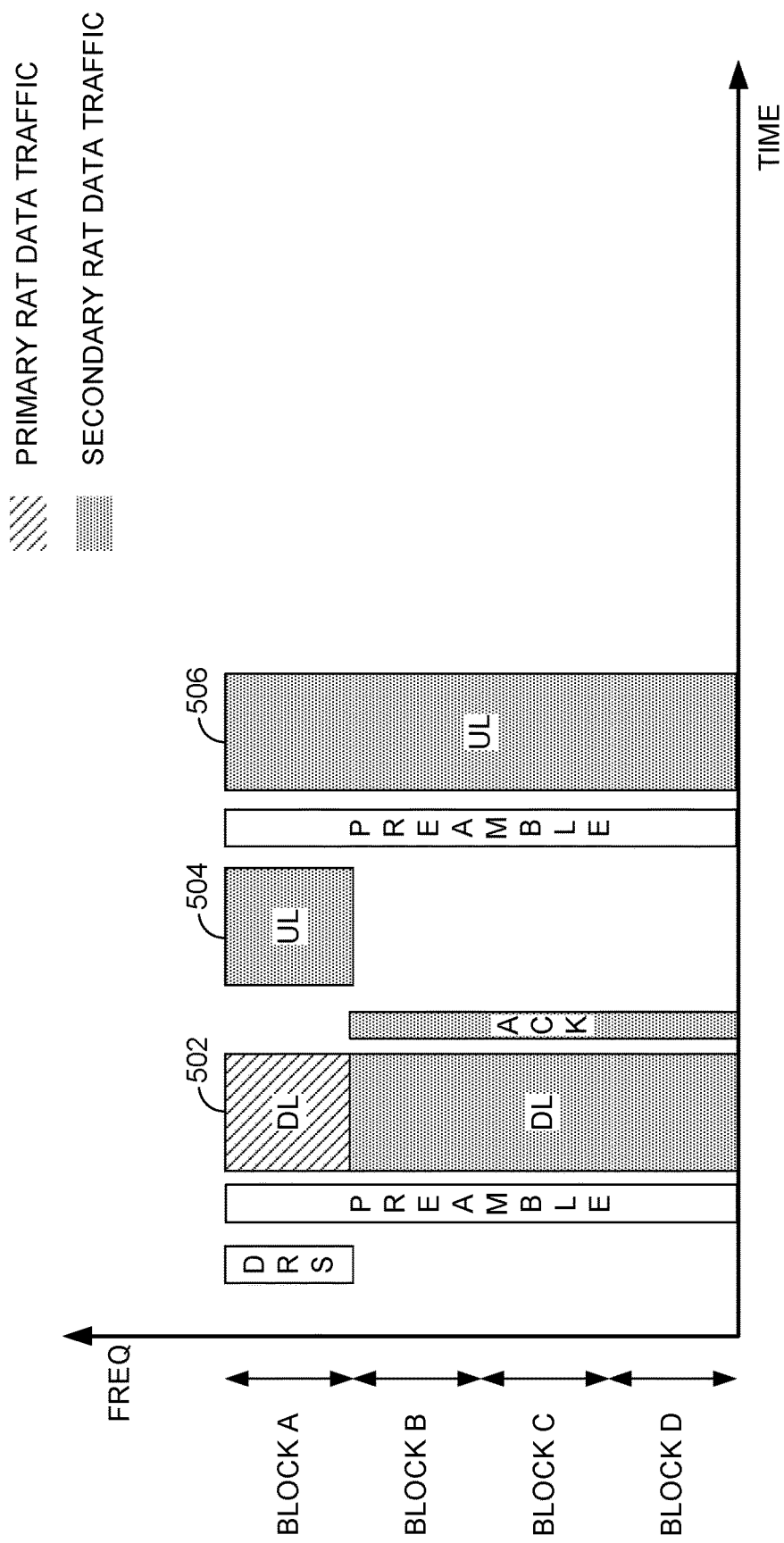
FIG. 5 is a resource diagram illustrating another example RAT-aggregation TDM scheduling scheme in which both uplink and downlink scheduling are supported by the secondary RAT.

FIG. 5 is a resource diagram illustrating another example RAT-aggregation TDM scheduling scheme in which both uplink and downlink scheduling are supported by the secondary RAT. In this example, the communication medium 140 again encompasses four blocks of spectrum, including Blocks A-D. The primary RAT generally provides narrowband operation in Block A and the secondary RAT generally provides wideband operation in Blocks A-D. As discussed above, various control signaling may be sent as appropriate for a given implementation, including DRS and a channel-clearing preamble in the illustrated example.

As shown, because uplink scheduling is supported by the secondary RAT, uplink data traffic may be separated from downlink data traffic such that primary and secondary RAT traffic may be generally served concurrently. That is, Frequency Division Multiplexing (FDM) may be employed to avoid inter-RAT interference while more efficiently utilizing the communication medium 140.

In the illustrated example, downlink data traffic for both access terminals designated for primary RAT operation and access terminals designated for secondary RAT operation may be transmitted in a first period of time 502. The downlink data traffic for access terminals designated for primary RAT operation may utilize frequency Block A. The downlink data traffic for access terminals designated for secondary RAT operation may utilize the remaining frequency Blocks B-D. Uplink data traffic for access terminals designated for primary RAT operation may then be received in a second period of time 504 and uplink data traffic for access terminals designated for secondary RAT operation may then be received in a third period of time 506.

In some scenarios, the downlink data traffic for the different RATs may be transmitted to different access terminals. In other scenarios, however, the downlink data traffic for the different RATs may be transmitted to the same access terminal. For example, the access terminal 120 may be scheduled for downlink data traffic in accordance with both the primary RAT and the secondary RAT in the first period of time 502.

Based on the particular scheduling employed, the RAT aggregation scheme may be further optimized in various ways. For example, since the secondary RAT may be used for access terminals with better SINR, the access point 110 may perform additional power control operations for those access terminals. In particular, the access point 110 may reduce their transmission power and increase their noise tolerance (e.g., a backoff threshold such as a CCA threshold), which will both increase spatial reuse and Medium Access Control (MAC) efficiency. Lowering the transmission power may also help to reduce ACK interference.

As another example, the access point 110 may refrain from transmitting any beacon signals associated with the secondary RAT. This may help to reduce signaling noise, since control signaling may be more efficiently exchanged in accordance with the primary RAT.

As another example, the access point 110 and the access terminal 120 may perform idle, paging, or random access procedures in accordance with the primary RAT when the access terminal 120 enters an idle mode. Once again, this may help to reduce signaling noise, since control signaling may be more efficiently exchanged in accordance with the primary RAT, because idle, paging or random access procedures may be more robust over the primary RAT.

As another example, the access point 110 may send a Discontinuous Reception (DRX) mode command to the access terminal in accordance with either the secondary RAT or the primary RAT. In one particular example, the DRX mode command may be sent via a MAC header Information Element (IE) defined by the secondary RAT because the DRX cycle on the secondary RAT may be shorter as a function of traffic "burstiness". In this case, if the access terminal is configured in the secondary RAT mode and wakes up for DRX, the access terminal may continue in the secondary RAT mode and thereby receive the DRX mode command over the secondary RAT. However, it is also possible for the DRX mode command to be conveyed over the primary RAT as noted above.

Figure 6A:
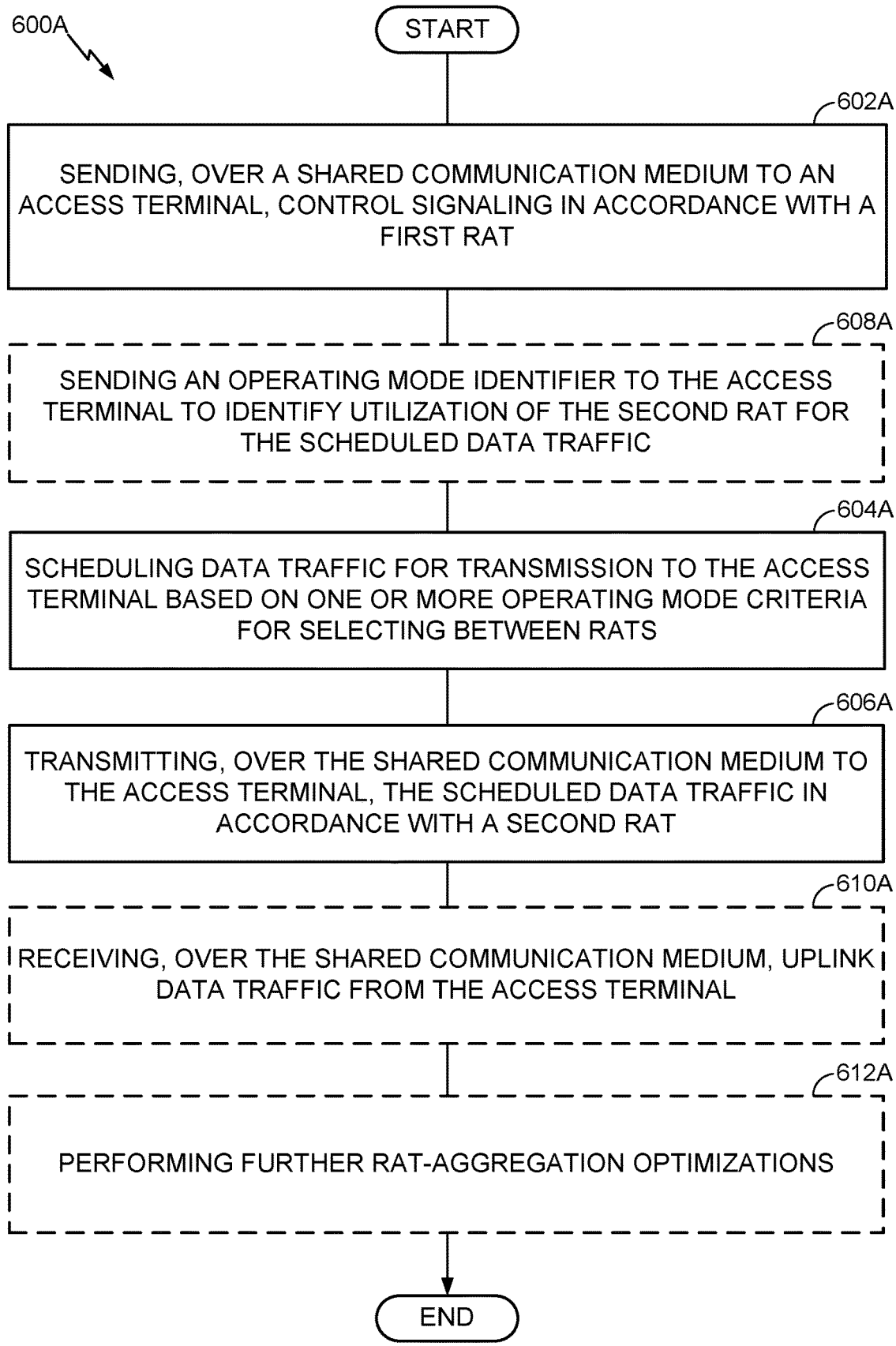
FIG. 6A is a flow diagram illustrating an example method of communication in accordance with the techniques described herein.

FIG. 6A is a flow diagram illustrating an example method of communication in accordance with the techniques described above. The method 600A may be performed, for example, by an access point (e.g., the access point 110 illustrated in FIG. 1) operating on a shared communication medium. As an example, the communication medium may include one or more time, frequency, or space resources on an unlicensed radio frequency band shared between LTE technology and Wi-Fi technology devices.

As shown, the access point may send, over a shared communication medium to an access terminal, control signaling in accordance with a first RAT (block 602A). The access point may also schedule data traffic for transmission to the access terminal based on one or more operating mode criteria for selecting between RATs (block 604A), and transmit, over the shared communication medium to the access terminal, the scheduled data traffic in accordance with a second RAT (block 606A).

As discussed in more detail above, the shared communication medium may include, for example, a common set of channels that are utilized by both the first and second RATs. In an alternative example, as noted above, the primary and secondary RATs may utilize different sets of channels within the shared communication medium. The control signaling may be associated, for example, with system discovery, acquisition, authentication, mobility, RRM, paging, RLF, and/or DRX.

As also discussed in more detail above, the one or more operating mode criteria may include, for example, a signal quality criterion, a traffic QoS criterion, and/or a mobility criterion. As an example, the scheduling (block 604A) may include scheduling the data traffic for transmission to the access terminal in accordance with the second RAT based on a signal quality of the access terminal being above a threshold. As another example, the scheduling (block 604A) may include scheduling the data traffic for transmission to the access terminal in accordance with the second RAT based on a traffic QoS of the access terminal being below a threshold. As another example, the scheduling (block 604A) may include scheduling the data traffic for transmission to the access terminal in accordance with the second RAT based on a mobility of the access terminal being below a threshold.

In some designs, the access point 110 may send an operating mode identifier to the access terminal to identify utilization of the second RAT for the scheduled data traffic (optional block 608A). As an example, the operating mode identifier may be sent dynamically as part of a channel reservation message. As another example, the operating mode identifier may be sent semi-statically as part of an RRC message.

In some designs, the access point may also receive, over the shared communication medium, uplink data traffic from the access terminal (optional block 610A). As an example, the access point may receive, over the shared communication medium, uplink data traffic in accordance with the second RAT, with the transmitting and the receiving in accordance with the second RAT being performed in a common time period of a TDM scheme separating first RAT and second RAT traffic. As another example, the access point may schedule uplink data traffic in accordance with the second RAT over the shared communication medium, and transmit downlink data traffic in accordance with the first RAT substantially concurrently with the transmitting in accordance with the second RAT, with the transmitting in accordance with the first RAT and the transmitting in accordance with the second RAT being frequency division multiplexed. Here, the transmitting in accordance with the first RAT and the transmitting in accordance with the second RAT may correspond to transmissions to the same access terminal, or may correspond to transmissions to different access terminals.

In some designs, the access point may perform further RAT-aggregation optimizations (optional block 612A). For example, the access point may perform power control to reduce a transmission power and/or increase a backoff threshold associated with the transmitting in accordance with the second RAT. In addition or as an alternative, the access point may refrain from transmitting any beacon signals associated with the second RAT. In addition or as an alternative, the access point may perform an idle, paging, or random access procedure with the access terminal in accordance with the first RAT in response to the access terminal entering an idle mode. In addition or as an alternative, the access point may send a DRX mode command to the access terminal in accordance with the second RAT (e.g., via a MAC header IE defined by the second RAT).

Figure 6B:
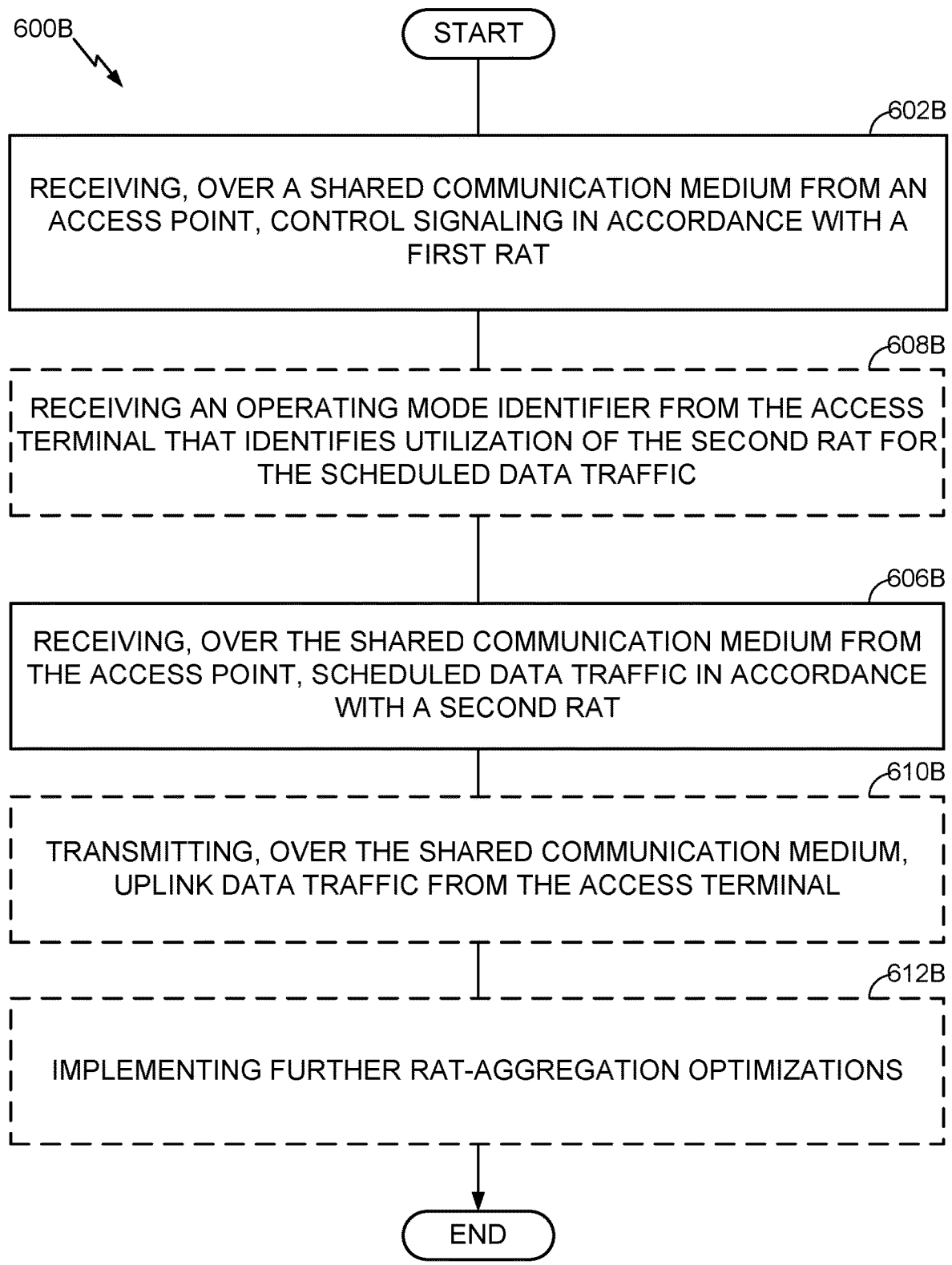
FIG. 6B is another flow diagram illustrating an example method of communication in accordance with the techniques described herein.

FIG. 6B is a flow diagram illustrating another example method of communication in accordance with the techniques described above. The method 600B may be performed, for example, by an access terminal 120 (e.g., the access point 110 illustrated in FIG. 1) operating on a shared communication medium. As an example, the communication medium may include one or more time, frequency, or space resources on an unlicensed radio frequency band shared between LTE technology and Wi-Fi technology devices. In particular, the method 600B may be implemented in conjunction with the method 600A described above with respect to FIG. 6A, except from the access terminal perspective instead of the access point perspective.

As shown, the access terminal may receive, over a shared communication medium from the access point, control signaling in accordance with a first RAT (block 602B). Block 602B may map to block 602A of FIG. 6A in an example. While not illustrated expressly in FIG. 6B, the access point may also schedule data traffic for transmission to the access terminal based on one or more operating mode criteria for selecting between RATs (described above with respect to block 604A). As a result of this scheduling, the access terminal may receive, over the shared communication medium from the access point, the scheduled data traffic in accordance with a second RAT (block 606B). Block 606B may map to block 606A of FIG. 6A in an example.

As discussed in more detail above, the shared communication medium may include, for example, a common set of channels that are utilized by both the first and second RATs. In an alternative example, as noted above, the primary and secondary RATs may utilize different sets of channels within the shared communication medium. The control signaling may be associated, for example, with system discovery, acquisition, authentication, mobility, RRM, paging, RLF, and/or DRX.

In some designs, the access terminal may receive an operating mode identifier from the access point to identify utilization of the second RAT for the scheduled data traffic (optional block 608B). Block 608B may map to block 608A of FIG. 6A in an example. As an example, the operating mode identifier may be received dynamically as part of a channel reservation message. As another example, the operating mode identifier may be received semi-statically as part of an RRC message.

In some designs, the access terminal may also transmit, over the shared communication medium, uplink data traffic to the access point (optional block 610B). Block 610B may map to block 610A of FIG. 6A in an example.

In some designs, the access terminal may implement further RAT-aggregation optimizations (optional block 612B). Block 612B may map to block 612A of FIG. 6A in an example. For example, the access point may perform power control to reduce a transmission power and/or increase a backoff threshold associated with the transmitting in accordance with the second RAT. In addition or as an alternative, the access point may refrain from transmitting any beacon signals associated with the second RAT. In addition or as an alternative, the access terminal may perform an idle, paging, or random access procedure with the access point in accordance with the first RAT in response to the access terminal entering an idle mode. In addition or as an alternative, the access terminal may receive a DRX mode command from the access point in accordance with the second RAT (e.g., via a MAC header IE defined by the second RAT).

For generality, the access point 110 and the access terminal 120 are shown in FIG. 1 only in relevant part as including the operating mode controller 112 and the operating mode controller 122, respectively. It will be appreciated, however, that the access point 110 and the access terminal 120 may be configured in various ways to provide or otherwise support the RAT aggregation techniques discussed herein.

Figure 7:
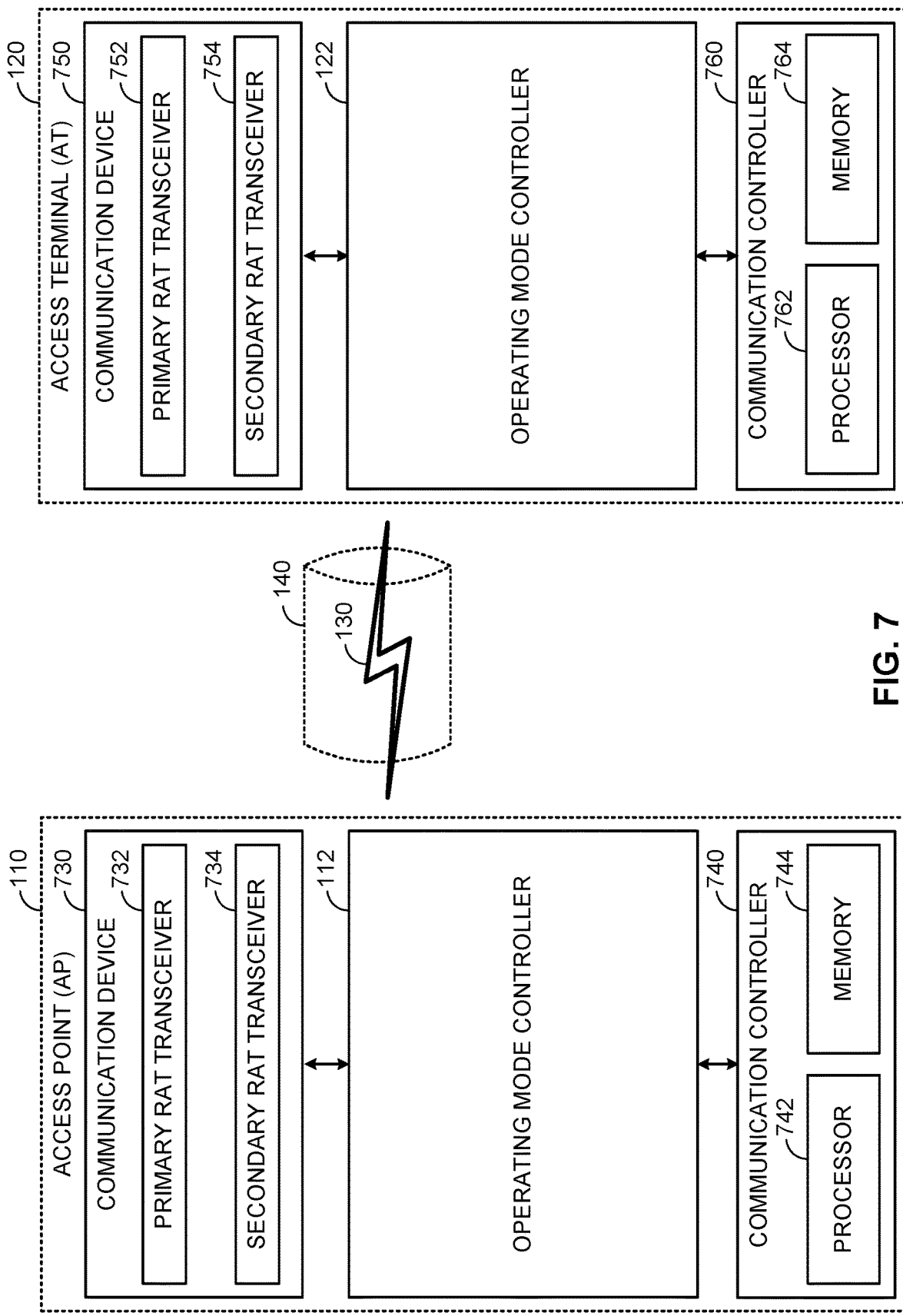
FIG. 7 is a device-level diagram illustrating example components of an access point and an access terminal in more detail.

FIG. 7 is a device-level diagram illustrating example components of the access point 110 and the access terminal 120 of the wireless network 100 in more detail. As shown, the access point 110 and the access terminal 120 may each generally include a wireless communication device (represented by the communication devices 730 and 750) for communicating with other wireless nodes via at least one designated RAT. The communication devices 730 and 750 may be variously configured for transmitting and encoding signals, and, conversely, for receiving and decoding signals in accordance with the designated RAT (e.g., messages, indications, information, pilots, and so on).

The communication devices 730 and 750 may include, for example, one or more transceivers, such as respective primary RAT transceivers 732 and 752, and co-located secondary RAT transceivers 734 and 754, respectively. As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a radio chip or similar circuitry providing low-level sniffing only). Further, as used herein, the term "co-located" (e.g., radios, access points, transceivers, etc.) may refer to one of various arrangements. For example, components that are in the same housing; components that are hosted by the same processor; components that are within a defined distance of one another; and/or components that are connected via an interface (e.g., an Ethernet switch) where the interface meets the latency requirements of any required inter-component communication (e.g., messaging).

The access point 110 and the access terminal 120 may also each generally include a communication controller (represented by the communication controllers 740 and 760) for controlling operation of their respective communication devices 730 and 750 (e.g., directing, modifying, enabling, disabling, etc.). The communication controllers 740 and 760 may include one or more processors 742 and 762, and one or more memories 744 and 764 coupled to the processors 742 and 762, respectively. The memories 744 and 764 may be configured to store data, instructions, or a combination thereof, either as on-board cache memory, as separate components, a combination, etc. The processors 742 and 762 and the memories 744 and 764 may be standalone communication components or may be part of the respective host system functionality of the access point 110 and the access terminal 120.

It will be appreciated that the operating mode controller 112 and the operating mode controller 122 may be implemented in different ways. In some designs, some or all of the functionality associated therewith may be implemented by or otherwise at the direction of at least one processor (e.g., one or more of the processors 742 and/or one or more of the processors 762) and at least one memory (e.g., one or more of the memories 744 and/or one or more of the memories 764), at least one transceiver (e.g., one or more of the transceivers 732 and 734 and/or one or more of the transceivers 752 and 754), or a combination thereof. In other designs, some or all of the functionality associated therewith may be implemented as a series of interrelated functional modules.

Accordingly, it will be appreciated that the components in FIG. 7 may be used to perform operations described above with respect to FIGS. 1-6. For example, the access point 110 may, via the primary RAT transceiver 732, send, over the shared communication medium 140 to the access terminal 120, control signaling in accordance with the primary RAT. The access point 110 may, via the processor 742 and the memory 744, schedule data traffic for transmission to the access terminal 120 based on one or more operating mode criteria for selecting between RATs. The access point 110 may, via the secondary RAT transceiver 734, transmit, over the shared communication medium 140 to the access terminal 120, the scheduled data traffic in accordance with the secondary RAT. The access terminal 120 may use its various components to perform complementary functions.

Figure 8:
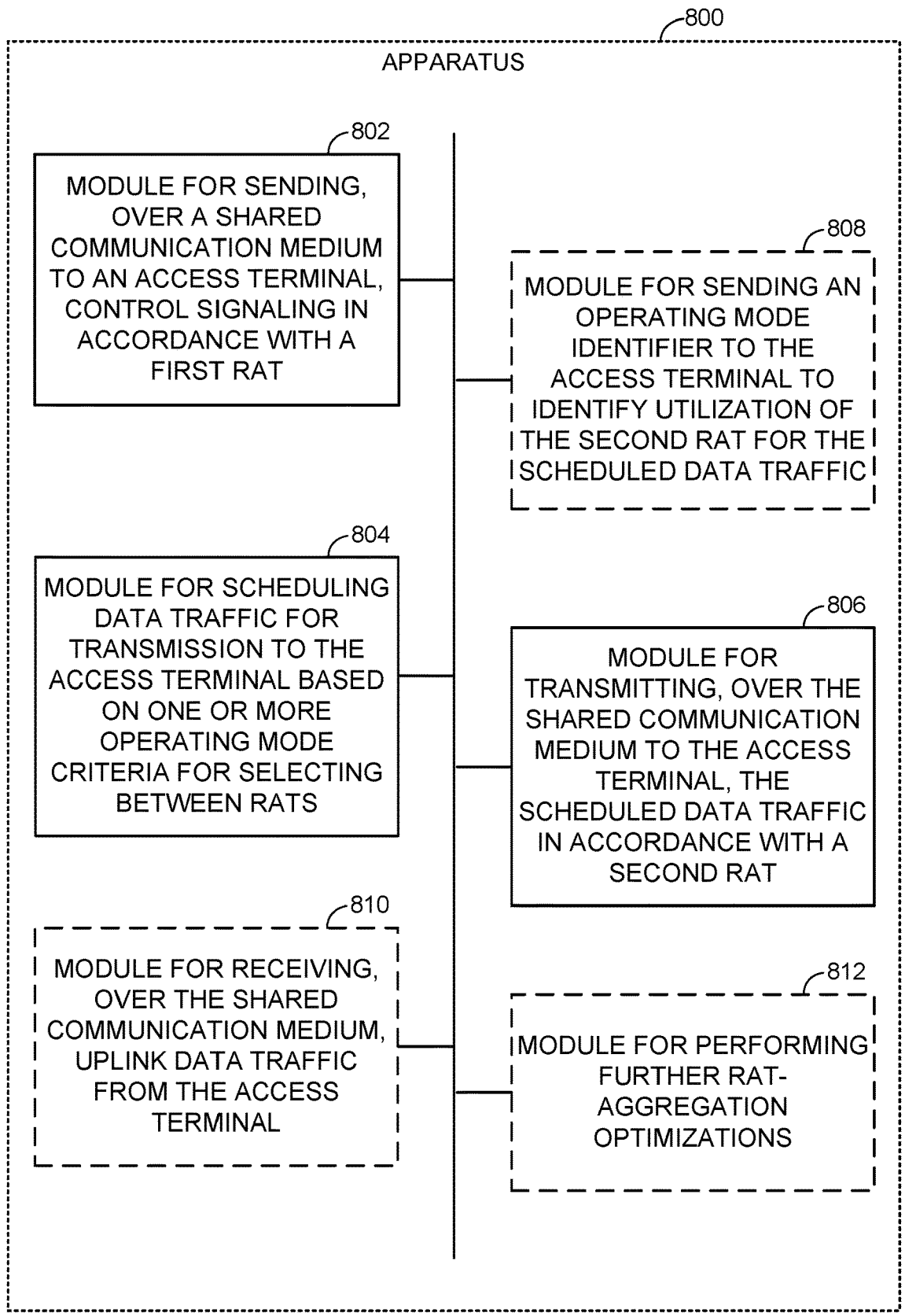
FIG. 8 illustrates an example apparatus represented as a series of interrelated functional modules.

FIG. 8 illustrates an example apparatus for implementing the operating mode controller 112, or, in some instances, the operating mode controller 122 (e.g., when acting as a hotspot) represented as a series of interrelated functional modules. In the illustrated example, the apparatus 800 includes a module for sending 802, a module for scheduling 804, a module for transmitting 806, an (optional) module for sending 808, an (optional) module for receiving 810, and an (optional) module for performing 812.

The module for sending 802 may be configured to send, over a shared communication medium to an access terminal, control signaling in accordance with a first RAT. The module for scheduling 804 may be configured to schedule data traffic for transmission to the access terminal based on one or more operating mode criteria for selecting between RATs. The module for transmitting 806 may be configured to transmit, over the shared communication medium to the access terminal, the scheduled data traffic in accordance with a second RAT.

Figure 9:
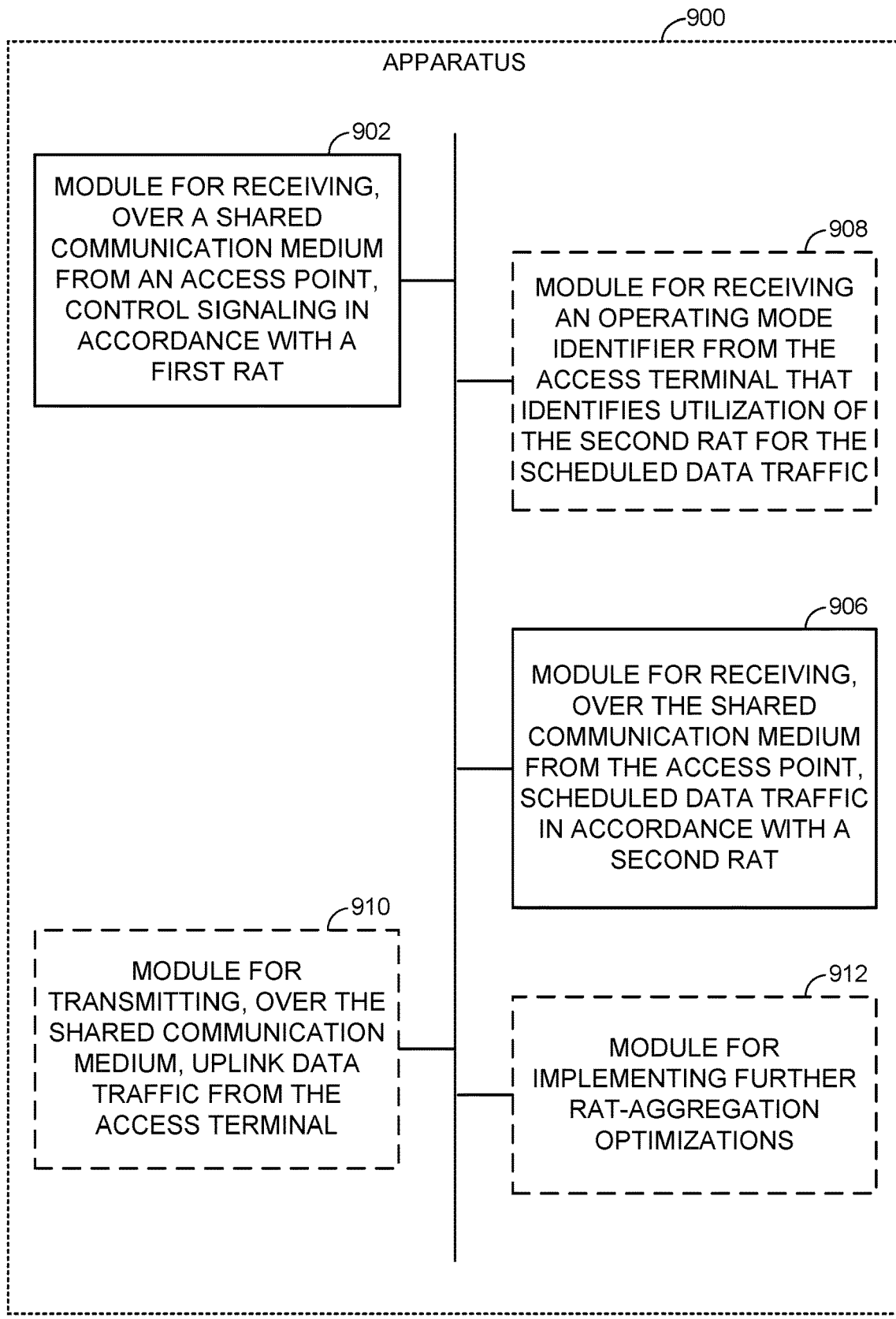
FIG. 9 illustrates another example apparatus represented as a series of interrelated functional modules.

FIG. 9 illustrates an example apparatus for implementing the operating mode controller 122 represented as a series of interrelated functional modules. In the illustrated example, the apparatus 900 includes a module for receiving 902, a module for receiving 906, an (optional) module for receiving 908, an (optional) module for transmitting 910, and an (optional) module for implementing 912.

The module for sending 902 may be configured to receive, over a shared communication medium from an access point, control signaling in accordance with a first RAT. The module for receive 906 may be configured to receive, over the shared communication medium from the access point, scheduled data traffic in accordance with a second RAT.

As discussed in more detail above, the shared communication medium may include, for example, a common set of channels that are utilized by both the first and second RATs. In an alternative example, as noted above, the primary and secondary RATs may utilize different sets of channels within the shared communication medium. The control signaling may be associated, for example, with system discovery, acquisition, authentication, mobility, RRM, paging, RLF, and/or DRX.

As also discussed in more detail above, the one or more operating mode criteria may include, for example, a signal quality criterion, a traffic QoS criterion, and/or a mobility criterion. As an example, the module for scheduling 804 may be configured to schedule the data traffic for transmission to the access terminal in accordance with the second RAT based on a signal quality of the access terminal being above a threshold. As another example, the module for scheduling 804 may be configured to schedule the data traffic for transmission to the access terminal in accordance with the second RAT based on a traffic QoS of the access terminal being below a threshold. As another example, the module for scheduling 804 may be configured to schedule the data traffic for transmission to the access terminal in accordance with the second RAT based on a mobility of the access terminal being below a threshold.

The module for sending 808 may be configured to send an operating mode identifier to the access terminal to identify utilization of the second RAT for the scheduled data traffic. As an example, the operating mode identifier may be sent dynamically as part of a channel reservation message. As another example, the operating mode identifier may be sent semi-statically as part of an RRC message.

The module for receiving 810 may be configured to receive, over the shared communication medium, uplink data traffic from the access terminal. As an example, the module for receiving 810 may be configured to receive, over the shared communication medium, uplink data traffic in accordance with the second RAT, with the transmitting and the receiving in accordance with the second RAT being performed in a common time period of a TDM scheme separating first RAT and second RAT traffic. As another example, the module for receiving 810 may be configured to schedule uplink data traffic in accordance with the second RAT over the shared communication medium, and transmit downlink data traffic in accordance with the first RAT substantially concurrently with the transmitting in accordance with the second RAT, with the transmitting in accordance with the first RAT and the transmitting in accordance with the second RAT being frequency division multiplexed. Here, the transmitting in accordance with the first RAT and the transmitting in accordance with the second RAT may correspond to transmissions to the same access terminal, or may correspond to transmissions to different access terminals.

The module for performing 812 may be configured to perform further RAT-aggregation optimizations. For example, the module for performing 812 may be configured to perform power control to reduce a transmission power and/or increase a backoff threshold associated with the transmitting in accordance with the second RAT. In addition or as an alternative, the module for performing 812 may be configured to refrain from transmitting any beacon signals associated with the second RAT. In addition or as an alternative, the module for performing 812 may be configured to perform an idle, paging, or random access procedure with the access terminal in accordance with the first RAT in response to the access terminal entering an idle mode. In addition or as an alternative, the module for performing 812 may be configured to send a DRX mode command to the access terminal in accordance with the second RAT (e.g., via a MAC header IE defined by the second RAT).

The functionality of the modules of FIG. 8 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 8, as well as other components and functions described herein, may be implemented using any suitable means. Such means also may be implemented, at least in part, using corresponding structure as taught herein. For example, the components described above in conjunction with the "module for" components of FIG. 8 also may correspond to similarly designated "means for" functionality. Thus, in some aspects one or more of such means may be implemented using one or more of processor components, integrated circuits, or other suitable structure as taught herein, including as an algorithm. One skilled in the art will recognize in this disclosure an algorithm represented in the prose described above, as well in sequences of actions that may be represented by pseudocode. For example, the components and functions represented by FIG. 8 may include code for performing a LOAD operation, a COMPARE operation, a RETURN operation, an IF-THEN-ELSE loop, and so on.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, one skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of storage medium known in the art, transitory or non-transitory. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a transitory or non-transitory computer-readable medium embodying a method for communication.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of operating an access point, comprising:
   sending, by the access point over a shared communication medium to first and second access terminals, control signaling in accordance with a first Radio Access Technology (RAT);
   selecting, by the access point, one of the first RAT or a second RAT for transmission of data traffic to the first access terminal based on a first set of one or more operating mode criteria,
   wherein the first set of one or more operating mode criteria comprises a signal quality criterion, a traffic Quality of Service (QoS) criterion, a mobility criterion, or a combination thereof;
   selecting, by the access point, one of the first RAT or the second RAT for transmission of data traffic to the second access terminal based on a second set of one or more operating mode criteria;

scheduling, by the access point, data traffic for transmission to the first and second access terminals on the respective selected RATs; and transmitting, by the access point over the shared communication medium to the first and second access terminals, the scheduled data traffic in accordance with the respective selected RATs, wherein the first set of one or more operating mode criteria comprises a first performance requirement threshold, wherein the first performance requirement threshold is a signal quality threshold and the second set of one or more operating mode criteria comprises a second performance threshold that is different than the first performance requirement threshold, and wherein the selecting for transmission of data traffic to the first access terminal selects the second RAT as the respective selected RAT based on a signal quality of the first access terminal being above the signal quality threshold.

2. The method of claim 1, wherein the shared communication medium comprises a common set of channels that are utilized by both the first and second RATs, or wherein the first and second RATs utilize different sets of channels that overlap in part within the shared communication medium.

3. The method of claim 1, wherein the control signaling is associated with system discovery, acquisition, authentication, mobility, Radio Resource Management (RRM), paging, Radio Link Failure (RLF), Discontinuous Reception (DRX), or a combination thereof.

4. The method of claim 1, wherein the first performance requirement threshold is a QoS threshold, and wherein the selecting for transmission of data traffic to the first access terminal selects the second RAT as the respective selected RAT based on a traffic QoS of the first access terminal being below the QoS threshold.

5. The method of claim 1, wherein the selecting for transmission of data traffic to the first access terminal selects the second RAT as the respective selected RAT based on a mobility of the first access terminal being below a threshold.

6. The method of claim 1, further comprising sending an operating mode identifier to the first access terminal to identify utilization of the respective selected RAT for the scheduled data traffic for transmission to the first access terminal.

7. The method of claim 6, wherein the operating mode identifier is sent dynamically as part of a channel reservation message.

8. The method of claim 6, wherein the operating mode identifier is sent semi-statically as part of a Radio Resource Control (RRC) message.

9. The method of claim 1, wherein the selecting for transmission of data traffic to the first access terminal selects the second RAT as the respective selected RAT, further comprising:

receiving, over the shared communication medium, uplink data traffic in accordance with the second RAT from the first access terminal, wherein the transmitting and the receiving of data traffic with the first access terminal in accordance with the second RAT are performed in a common time period of a Time Division Multiplexing (TDM) scheme separating first RAT and second RAT traffic.

10. The method of claim 1, wherein the selecting for transmission of data traffic to the first access terminal selects the second RAT as the respective selected RAT, further comprising:

scheduling uplink data traffic in accordance with the second RAT over the shared communication medium; and transmitting downlink data traffic in accordance with the first RAT substantially concurrently with the transmitting to the first access terminal in accordance with the second RAT, wherein the transmitting in accordance with the first RAT and the transmitting to the first access terminal in accordance with the second RAT are Frequency Division Multiplexed (FDM).

11. The method of claim 10, wherein the transmitting in accordance with the first RAT and the transmitting to the first access terminal in accordance with the second RAT correspond to transmissions to the same access terminal.

12. The method of claim 10, wherein the transmitting in accordance with the first RAT and the transmitting to the first access terminal in accordance with the second RAT correspond to transmissions to different access terminals.

13. The method of claim 1, further comprising performing power control to reduce a transmission power or increase a backoff threshold associated with the transmitting for the first access terminal in accordance with the respective selected RAT.

14. The method of claim 1, further comprising refraining from transmitting any beacon signals to the first access terminal associated with the respective selected RAT.

15. The method of claim 1, further comprising performing an idle, paging, or random access procedure with the first access terminal in accordance with the first RAT in response to the first access terminal entering an idle mode.

16. The method of claim 1, further comprising sending a Discontinuous Reception (DRX) mode command to the first access terminal in accordance with the first RAT or the second RAT.

17. The method of claim 16, wherein the DRX mode command is sent via a Medium Access Control (MAC) header Information Element (IE) defined by the selected RAT.

18. An access point, comprising:

a first transceiver configured to send, over a shared communication medium to first and second access terminals, control signaling in accordance with a first Radio Access Technology (RAT);

at least one processor; at least one memory coupled to the at least one processor, the at least one processor and the at least one memory being configured to select one of the first RAT or a second RAT for transmission of data traffic to the first access terminal based on a first set of one or more operating mode criteria, wherein the first set of one or more operating mode criteria comprises a signal quality criterion, a traffic Quality of Service (QoS) criterion, a mobility criterion, or a combination thereof;

to select one of the first RAT or the second RAT for transmission of data traffic to the second access terminal based on a second set of one or more operating mode criteria, and to schedule data traffic for transmission to the first and second access terminals on the respective selected RATs; and a second transceiver configured to transmit, over the shared communication medium to the first and second access terminals, the scheduled data traffic in accordance with the respective selected RATs,
wherein the first set of one or more operating mode criteria comprises a first performance requirement threshold, wherein the first performance requirement threshold is a signal quality threshold and the second set of one or more operating mode criteria comprises a second performance threshold that is different than the first performance requirement threshold, and
wherein the selecting for transmission of data traffic to the first access terminal selects the second RAT as the respective selected RAT based on a signal quality of the first access terminal being above the signal quality threshold.

19. The access point of claim 18,
wherein the shared communication medium comprises a common set of channels that are utilized by both the first and second RATs, or
wherein the first and second RATs utilize different sets of channels within the shared communication medium.

20. The access point of claim 18, wherein the control signaling is associated with system discovery, acquisition, authentication, mobility, Radio Resource Management (RRM), paging, Radio Link Failure (RLF), Discontinuous Reception (DRX), or a combination thereof.

21. The access point of claim 18, wherein the first transceiver is further configured to send an operating mode identifier to the first access terminal to identify utilization of the respective selected RAT for the scheduled data traffic for transmission to the first access terminal.

22. The access point of claim 18,
wherein the at least one processor and the at least one memory are configured to select the second RAT as the respective selected RAT for transmission of data traffic to the first access terminal, and
wherein the second transceiver is further configured to:
receive, over the shared communication medium, uplink data traffic in accordance with the second RAT from the first access terminal; and
perform the transmitting and the receiving of data traffic with the first access terminal in accordance with the second RAT in a common time period of a Time Division Multiplexing (TDM) scheme separating first RAT and second RAT traffic.

23. The access point of claim 18, wherein the at least one processor and the at least one memory are further configured to perform power control to reduce a transmission power or increase a backoff threshold associated with the second transceiver transmitting to the first access terminal in accordance with the respective selected RAT.

24. The access point of claim 18, wherein the second transceiver is further configured to refrain from transmitting any beacon signals to the first access terminal associated with the respective selected RAT.

25. The access point of claim 18, wherein the first transceiver is further configured to perform an idle, paging, or random access procedure with the first access terminal in accordance with the first RAT in response to the first access terminal entering an idle mode.

26. An access point, comprising:
means for sending, over a shared communication medium to first and second access terminals, control signaling in accordance with a first Radio Access Technology (RAT);
means for selecting one of the first RAT or a second RAT for transmission of data traffic to the first access terminal based on a first set of one or more operating mode criteria,
wherein the first set of one or more operating mode criteria comprises a signal quality criterion, a traffic Quality of Service (QoS) criterion, a mobility criterion, or a combination thereof;
means for selecting, by the access point, one of the first RAT or the second RAT for transmission of data traffic to the second access terminal based on a second set of one or more operating mode criteria;
means for scheduling data traffic for transmission to the first and second access terminals on the respective selected RATs; and
means for transmitting, over the shared communication medium to the first and second access terminals, the scheduled data traffic in accordance with the respective selected RATs,
wherein the first set of one or more operating mode criteria comprises a first performance requirement threshold, wherein the first performance requirement threshold is a signal quality threshold and the second set of one or more operating mode criteria comprises a second performance threshold that is different than the first performance requirement threshold, and
wherein the selecting for transmission of data traffic to the first access terminal selects the second RAT as the respective selected RAT based on a signal quality of the first access terminal being above the signal quality threshold.

27. A non-transitory computer-readable medium comprising code, which, when executed by at least one processor of an access point, causes the at least one processor to perform operations for communication, the non-transitory computer-readable medium comprising:
code for sending, over a shared communication medium to first and second access terminals, control signaling in accordance with a first Radio Access Technology (RAT);
code for selecting one of the first RAT or a second RAT for transmission of data traffic to the first access terminal based on a first set of one or more operating mode criteria,
wherein the first set of one or more operating mode criteria comprises a signal quality criterion, a traffic Quality of Service (QoS) criterion, a mobility criterion, or a combination thereof;
code for selecting, by the access point, one of the first RAT or the second RAT for transmission of data traffic to the second access terminal based on a second set of one or more operating mode criteria;
code for scheduling data traffic for transmission to the first and second access terminals on the respective selected RATs; and
code for transmitting, over the shared communication medium to the first and second access terminals, the scheduled data traffic in accordance with the respective selected RATs,
wherein the first set of one or more operating mode criteria comprises a first performance requirement threshold, wherein the first performance requirement threshold is a signal quality threshold and the second set of one or more operating mode criteria comprises a second performance threshold that is different than the first performance requirement threshold, and wherein the selecting for transmission of data traffic to the first access terminal selects the second RAT as the respective selected RAT based on a signal quality of the first access terminal being above the signal quality threshold.

* * * * *